United States Patent
Martinez Mugica

(10) Patent No.: US 6,168,710 B1
(45) Date of Patent: Jan. 2, 2001

(54) INSTALLATION FOR CLEANING/RECOVERING LIQUIDS WITH PARTICLES IN SUSPENSION

(75) Inventor: Fernando Martinez Mugica, Durango (ES)

(73) Assignee: Ona Electro-Erosion, S.A. (ES)

( * ) Notice: Under 35 U.S.C. 154(b), the term of this patent shall be extended for 0 days.

(21) Appl. No.: 09/313,237

(22) Filed: May 17, 1999

(30) Foreign Application Priority Data

May 29, 1998  (ES) ................................................ 9801403 U

(51) Int. Cl.$^7$ ............................. B01D 17/12; B01D 36/04
(52) U.S. Cl. .......................... 210/86; 210/104; 210/248; 210/257.1; 210/485; 210/521
(58) Field of Search ............................. 210/86, 104, 109, 210/167, 168, 171, 195.1, 248, 257.1, 258, 433.1, 434, 448, 483, 485, 521, 532.1, 539, 259, 484, 770; 219/69.14, 69.15

(56) References Cited

U.S. PATENT DOCUMENTS

| | | | |
|---|---|---|---|
| 5,013,432 | * | 5/1991 | Martinez-Mugica ................. 210/258 |
| 5,118,411 | * | 6/1992 | Martinez-Mugica ................. 210/104 |
| 5,158,672 | * | 10/1992 | Lagreca ................................ 210/485 |
| 5,772,871 | * | 6/1998 | Lyon et al. ........................... 210/168 |

* cited by examiner

*Primary Examiner*—Joseph W. Drodge
(74) *Attorney, Agent, or Firm*—Bierman, Muserlian and Lucas

(57) ABSTRACT

Improved installation for cleaning/recovering liquids with particles in suspension, which is comprised of a first tank, which contaminated liquid with particles in suspension from cleaning the filtering equipment, reaches. This tank includes a guillotine-like mobile separation element, which subdivides it into two independent compartments. Contaminated liquid reaches one of them and the particles in suspension settle in the other compartment, forming sludge, which is evacuated to a second tank, which includes a grill-tank supplied with a renewable filter bag where the particles in suspension of this sludge are retained, recovering dirty liquid. This dirty liquid is evacuated to a third storage tank, from where it is recycled to the filtering equipment.

10 Claims, 1 Drawing Sheet

INSTALLATION FOR CLEANING/RECOVERING LIQUIDS WITH PARTICLES IN SUSPENSION

BACKGROUND OF THE INVENTION

This invention deals with an improved installation for cleaning/recovering liquids with particles in suspension.

It is a known fact that in many branches of industry or agriculture, there is a time when a liquid cannot be directly used as it has particles in suspension, making it necessary to filter it. Examples of this are: the dielectric of an electro-erosion machine, the coolant of a tooling machine, fermented wine, etc.

The problem arises when the filter becomes blocked due to use and the accumulation of particles.

The existing solutions consist in either scrapping the filter or in cleaning it, rejecting the material used in the operation, together with the waste impurities.

SUMMARY OF THE INVENTION

The object of the invention is an installation to recover liquid used in filter cleaning operations, only rejecting the impurities.

The installation targeted by the invention is characterised because it has:

a) a first tank, which the contaminated liquid reaches, with particles in suspension from cleaning the filtering equipment. It includes a guillotine-like mobile separation element, which subdivides it into two independent compartments. Contaminated liquid reaches one of them and the particles in suspension settle in the other compartment, forming sludge, which is evacuated to b) a second tank, which includes a grid-tank supplied with a renewable filter bag where the particles in suspension from this sludge are retained, recovering dirty liquid, which is evacuated to c) a third storage tank, from where this dirty liquid is recycled to the filtering equipment.

It is also characterised because the aforementioned first tank includes a base area, which is lower in level than the rest of the base, offering continuity by means of an inclined area. The sludge settles in these lowered and inclined base areas, providing an outlet duct towards this second tank, to evacuate these liquids and sludge.

It is also characterised because there is an overflow-duct in the aforementioned first tank, which reaches this third tank, permitting the dirty liquid to flow in one direction when, after the sludge has settled, a certain maximum level is reached or exceeded in the aforementioned first tank. This level is detected by one or several sensors.

BRIEF DESCRIPTION OF THE DRAWING

In order to have a better understanding of the objective of this invention; a preferential practical execution is shown on the figure, which is subject to incidental changes that will not affect the basics.

DETAILED DESCRIPTION OF THE INVENTION

Figure 1:
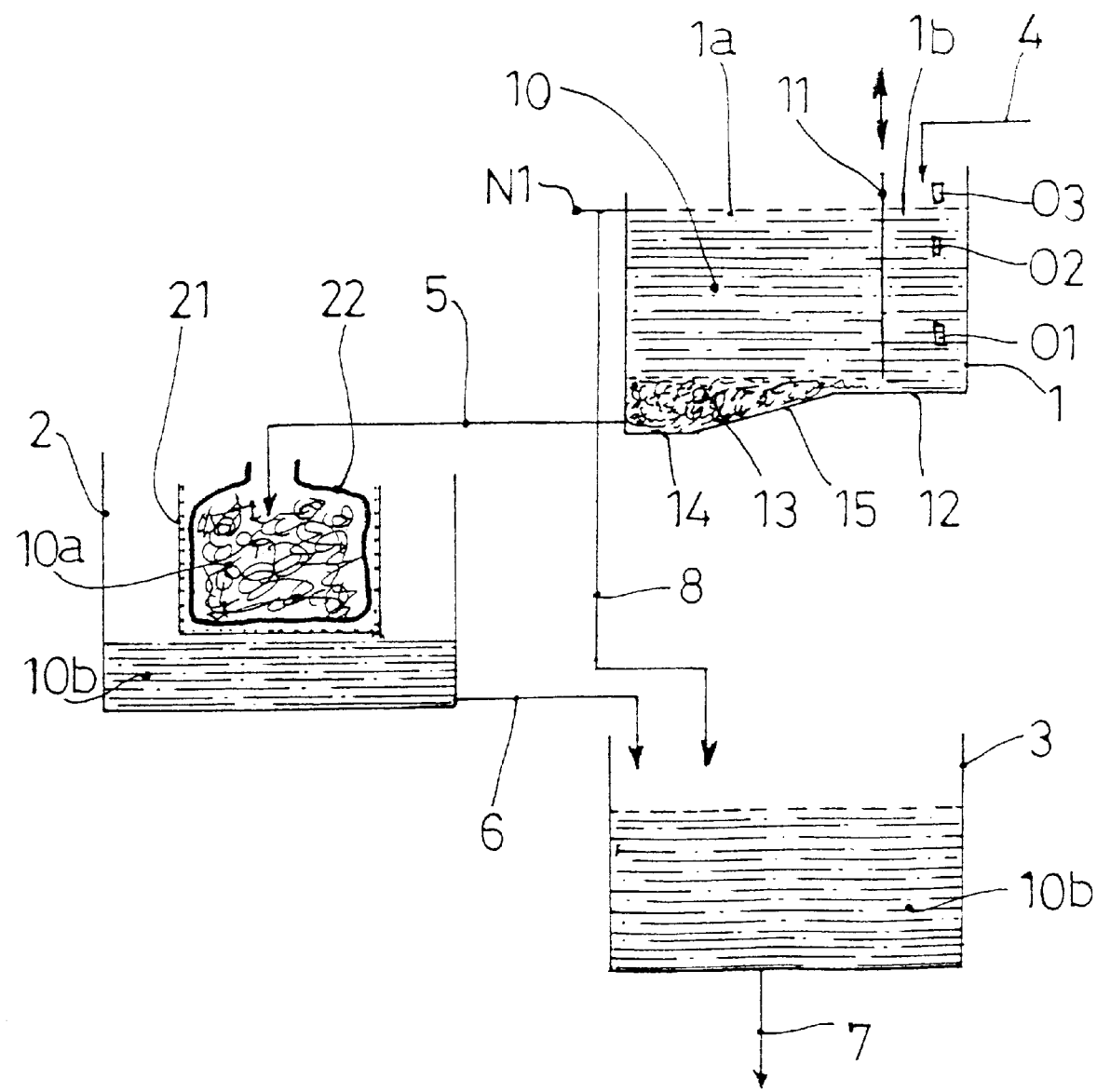
FIG. 1 is a representation of the installation targeted by the invention.

An installation for cleaning filters and recovering the liquid used in this cleaning operation, according to the invention as shown in the figure, includes a dirty liquid (10) duct (4), which reaches a first tank (1). The liquid used to clean the filter is the same liquid as that which is to be filtered for later recovery.

This first tank (1) has a guillotine-like mobile separation element (11), which subdivides it into two independent compartments (1a), (1b). Dirty liquid reaches compartment (1a) and the waste or sludge residue (13) mixed with dirty liquid settles in compartment (1b).

Tank (1) has a base area (14) which is lower in level respect to the rest of the base (12) offering continuity by means of an inclined area (15). By doing this, an area is generated which favours the settling of waste (13) mentioned above.

The liquid and sludge (13) is evacuated via a duct (5) to the second tank (2).

There is an inner tank (21) with a renewable bag (22) in this second tank.

The inner tank (21) has a grid and the renewable bag (22) is of filtering material.

The dirty liquid together with the settled sludge (13) reach the inside of the renewable bag (22) where the sludge (10a) is retained, letting the filtered liquid (10b) pass through reaching the tank (2) through the tank/grid (21), which positions the bag (22).

The recovered liquid (10b) has the typical characteristics and dirt of the liquid used in the cleaning operation. The recovered liquid joins the remainder of the cleaning liquid through an outlet duct (7).

In addition, the installation, according to the invention, has an overflow-duct (8) in the aforementioned first tank, which reaches the third tank (3) permitting the liquid (10b) to flow in one direction once the transferred sludge (13) has been removed when this liquid reaches or exceeds a certain level (N1). This is detected by some level sensors (01), (02), (03) see FIG. 1.

What is claimed is:

1. A filter system for filtering liquids having particles in suspension comprising:

a) a first tank for receiving said liquids having particles in suspension, said first tank having a vertically movable wall therein which divides said first tank into two compartments, a first compartment for receiving said liquid having particles in suspension and a second compartment into which said particles in suspension settle and form a sludge;

b) a second tank arranged to receive the sludge from said second compartment and having a grid-tank with a renewable filter bag therein, said sludge from said first tank being received in said filter bag, said filter bag retaining said particles from said sludge and liquid from said sludge flowing out of said filter bag and through said grid-tank into the remainder of said second tank; and c) a third tank for receiving said liquid from said second tank thereby producing a filtered liquid for recycling.

2. The system of claim 1 wherein
   said first tank has a base, said base comprising a low portion, a high portion and an inclined portion, said low portion being lower in elevation than said high portion, and said inclined portion connecting said low portion to said, high portion;
   said particles in suspension settling and forming a sludge in said low portion and inclined portion of said base; and
   an outlet duct formed in an area of said low portion of said base for evacuating said sludge from said first tank to said second tank.

3. The system of claim 2 further comprising:

an overflow duct from said first tank to said third tank; and one or more liquid level sensors for sensing the liquid level in said first tank, said sensors detecting the level of liquid in said first tank and said overflow duct permitting liquid to flow from said first tank to said third tank after particles settle and a certain level of liquid in said first tank is reached or exceeded.

4. The system of claim 3 wherein there are three liquid sensors.

5. The system of claim 1 further comprising:

an overflow duct from said first tank to said third tank; and one or more liquid level sensors for sensing the liquid level in said first tank, said sensors detecting the level of liquid in said first tank and said overflow duct permitting liquid to flow from said first tank to said third tank after particles settle and a certain level of liquid in said first tank is reached or exceeded.

6. The system of claim 5 wherein there are three liquid level sensors.

7. A filter system for filtering liquids having particles in suspension comprising:

a) a first tank for receiving said liquids having particles in suspension, said first tank having a vertically movable wall therein which divides said first tank into two compartments, a first compartment for receiving said liquid having particles in suspension and a second compartment into which said particles in suspension settle and form a sludge;

b) a second tank having a grid-tank with a renewable filter bag therein, said sludge from said first tank being received in said filter bag, said filter bag retaining said particles from said sludge and liquid from said sludge flowing out of said filter bag and through said grid-tank into the remainder of said second tank;

c) a third tank for receiving said liquid from said second tank thereby producing a filtered liquid for recycling;

d) an overflow duct from said first tank to said third tank; and e) one or more liquid level sensors for sensing the liquid level in said first tank, said sensors detecting the level of liquid in said first tank and said overflow duct permitting liquid to flow from said first tank to said third tank after particles settle and a certain level of liquid in said first tank is reached or exceeded.

8. The system of claim 7 wherein said first tank has a base, said base comprising a low portion, a high portion and an inclined portion, said low portion being lower in elevation than said high portion, and said inclined portion connecting said low portion to said high portion;

said particles in suspension settling and forming a sludge in said low portion and inclined portion of said base; and an outlet duct formed in an area of said low portion of said base for evacuating said sludge from said first tank to said second tank.

9. The system of claim 8 wherein there are three liquid level sensors.

10. The system of claim 7 wherein there are three liquid level sensors.

* * * * *